Jan. 26, 1943.   H. R. HARDING   2,309,449
BOTTLE VENDING AND EMPTY BOTTLE RECEIVING MACHINE
Filed Sept. 7, 1939   9 Sheets-Sheet 1
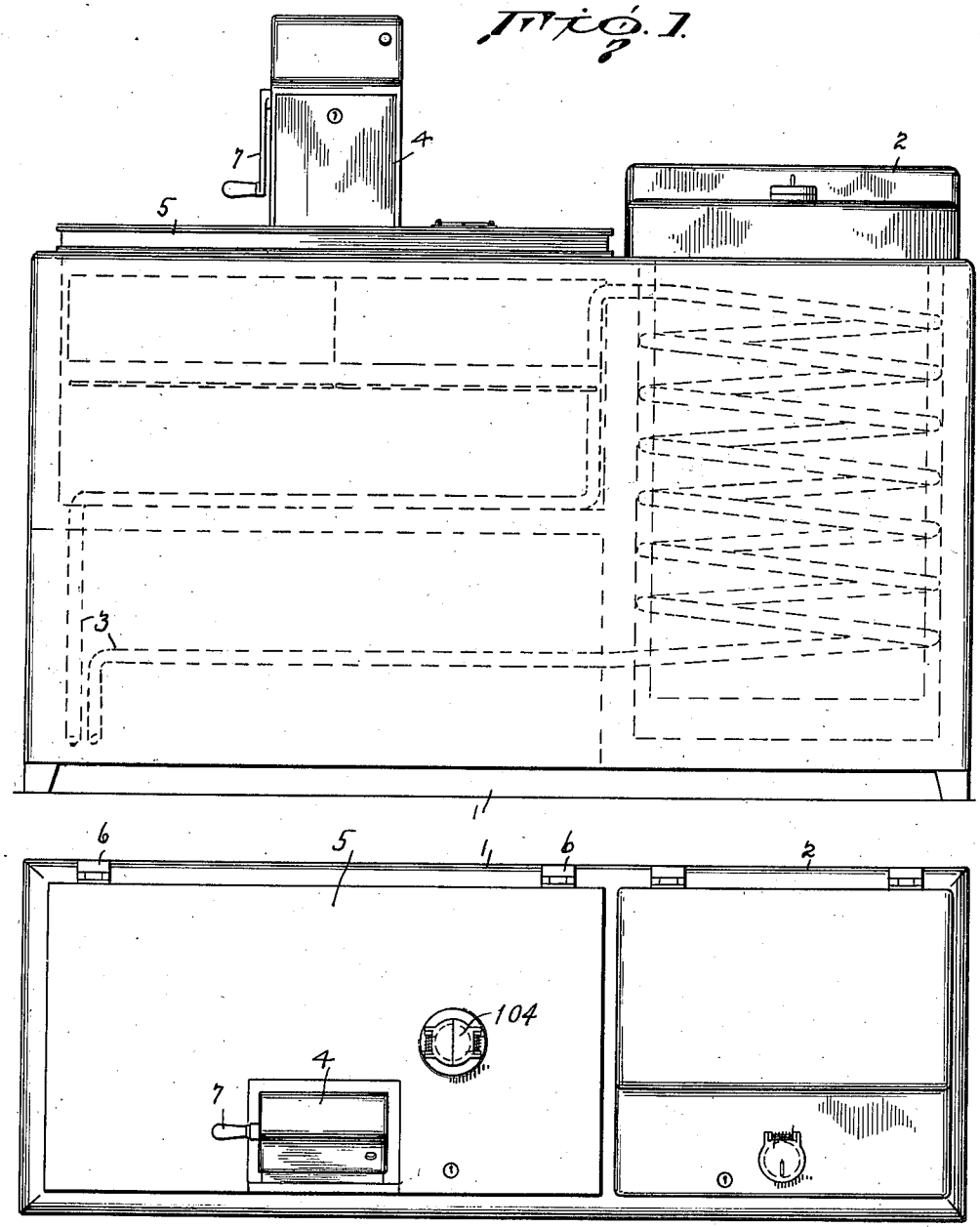

Jan. 26, 1943.  H. R. HARDING  2,309,449
BOTTLE VENDING AND EMPTY BOTTLE RECEIVING MACHINE
Filed Sept. 7, 1939  9 Sheets-Sheet 2
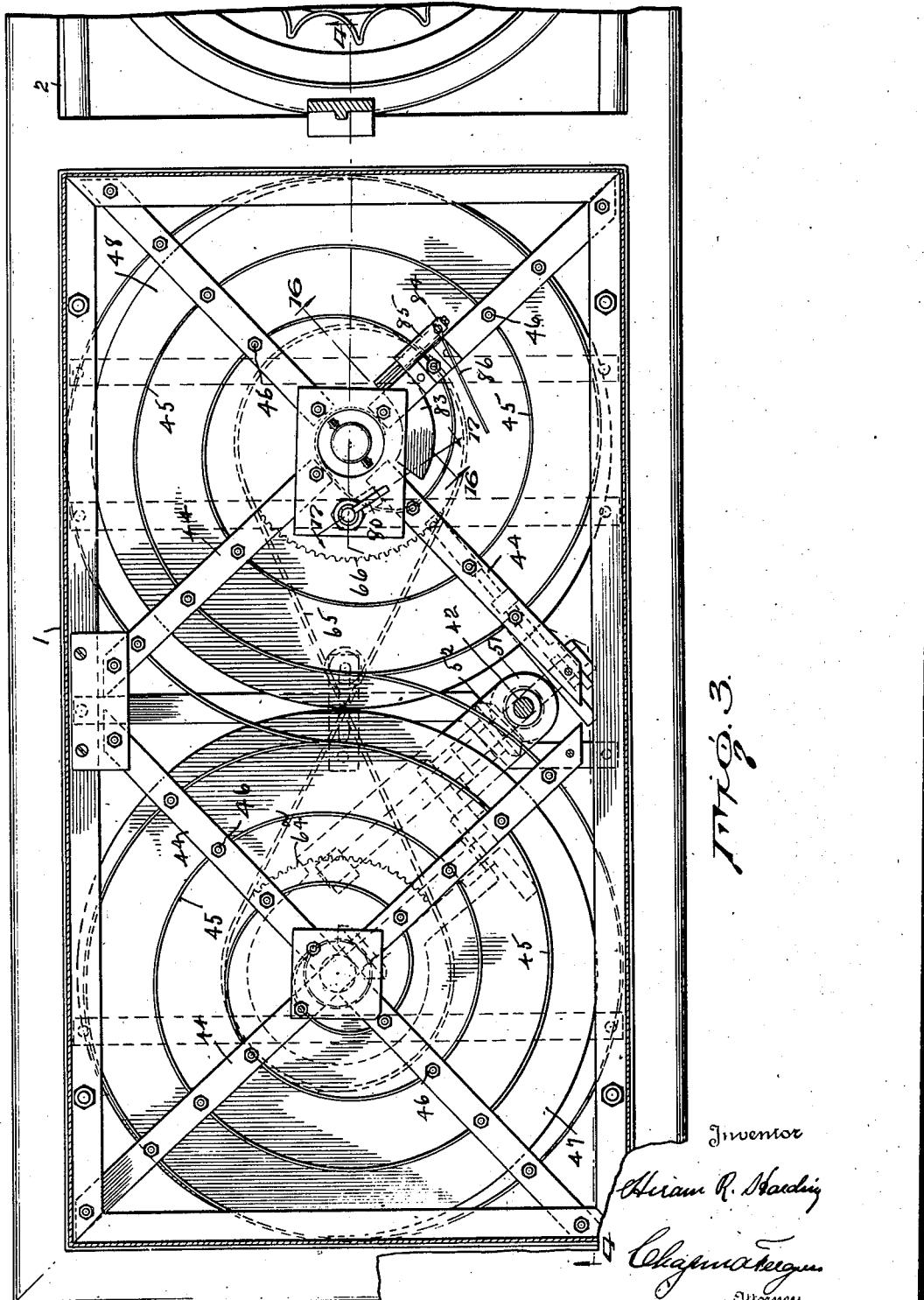

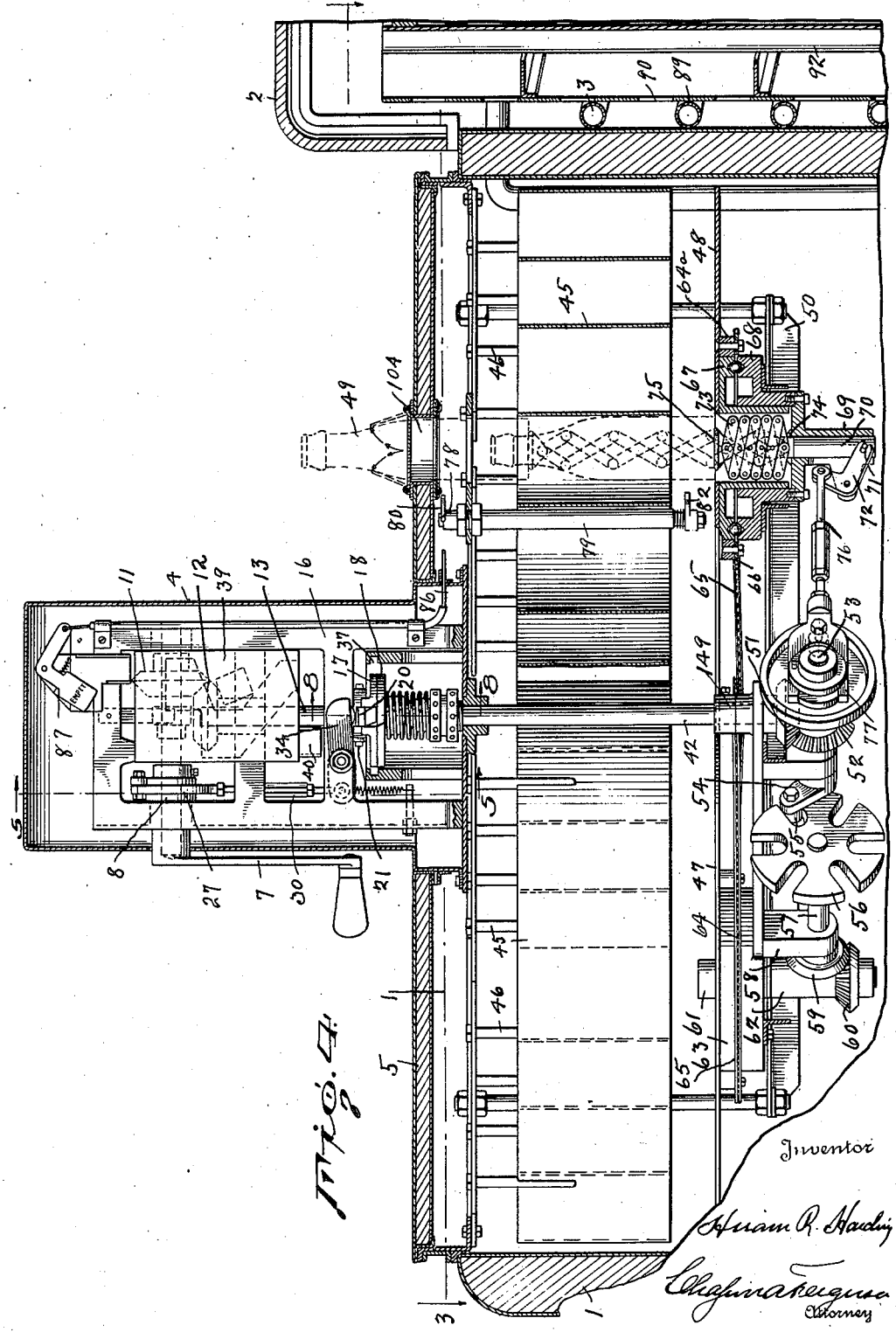

Jan. 26, 1943.                H. R. HARDING                2,309,449
            BOTTLE VENDING AND EMPTY BOTTLE RECEIVING MACHINE
                    Filed Sept. 7, 1939          9 Sheets-Sheet 4
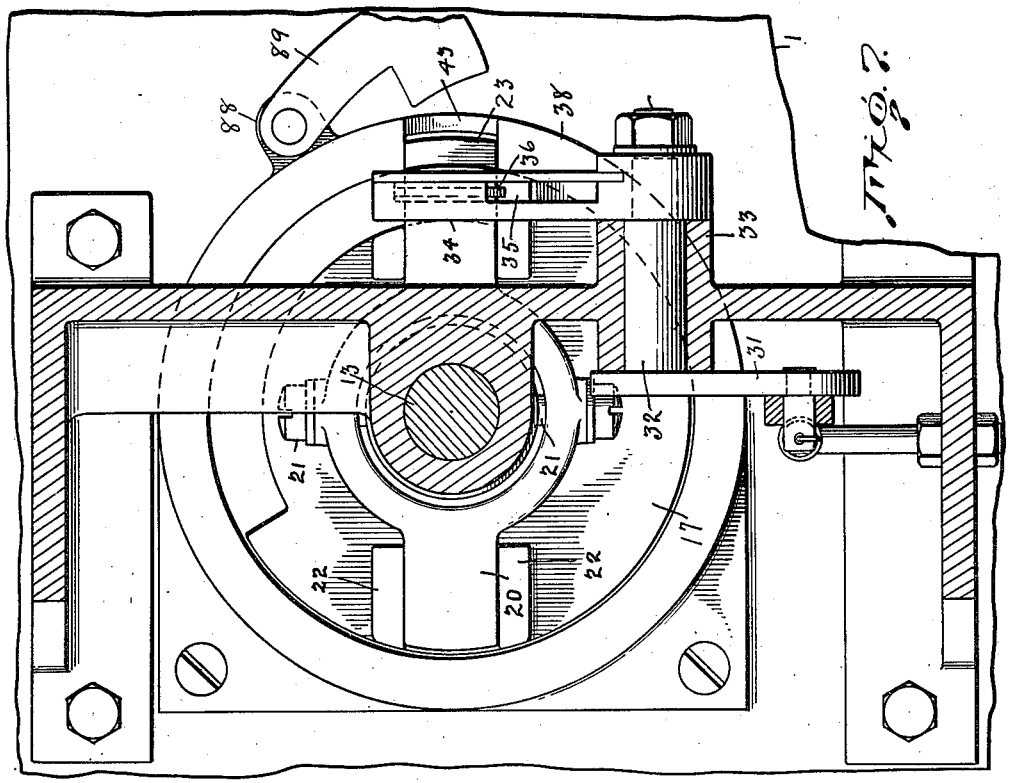
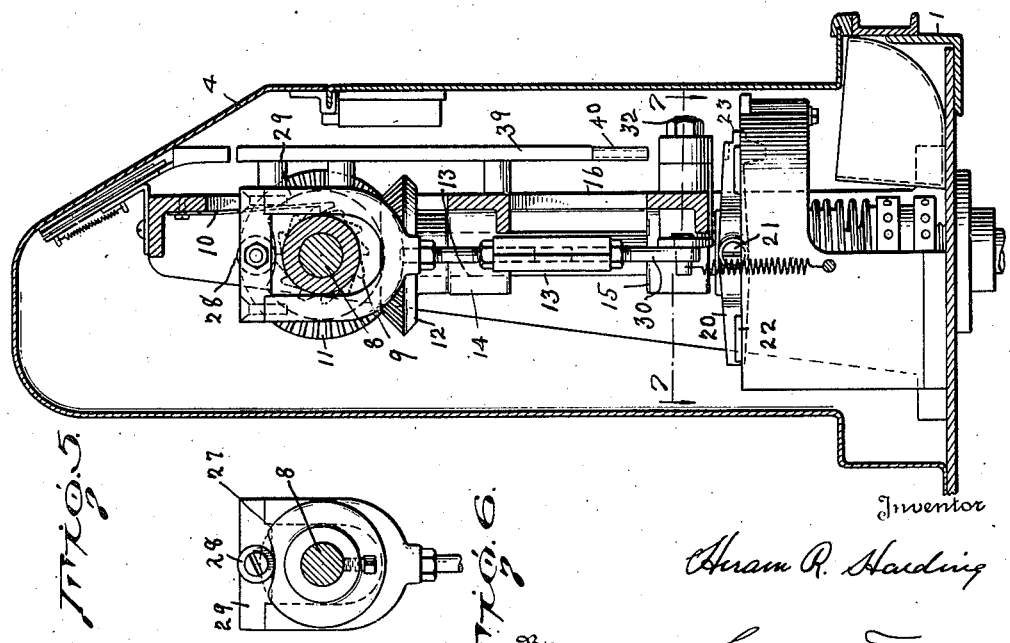
Inventor
Hiram R. Harding
By Chapman Ferguson
   Attorney

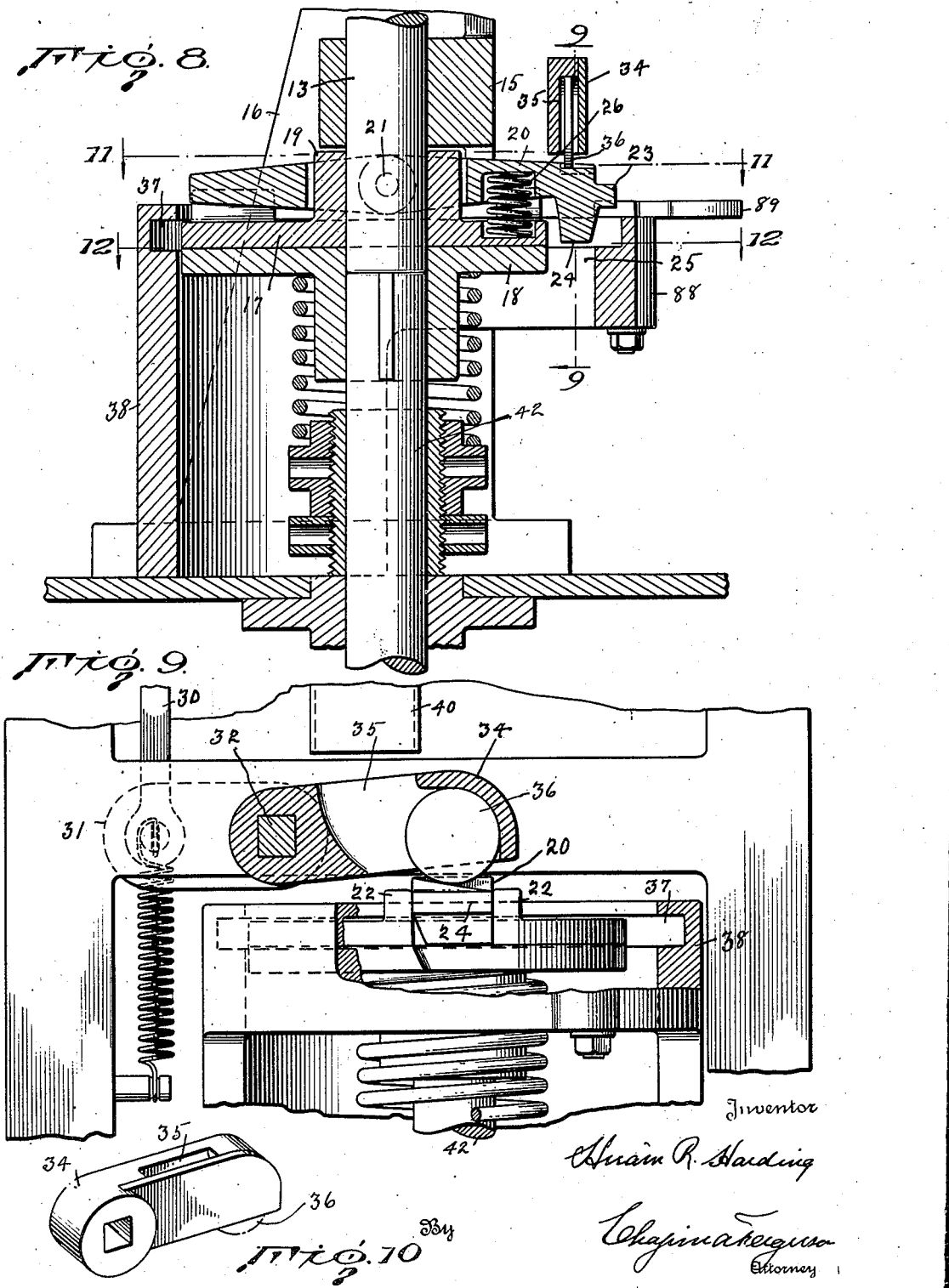

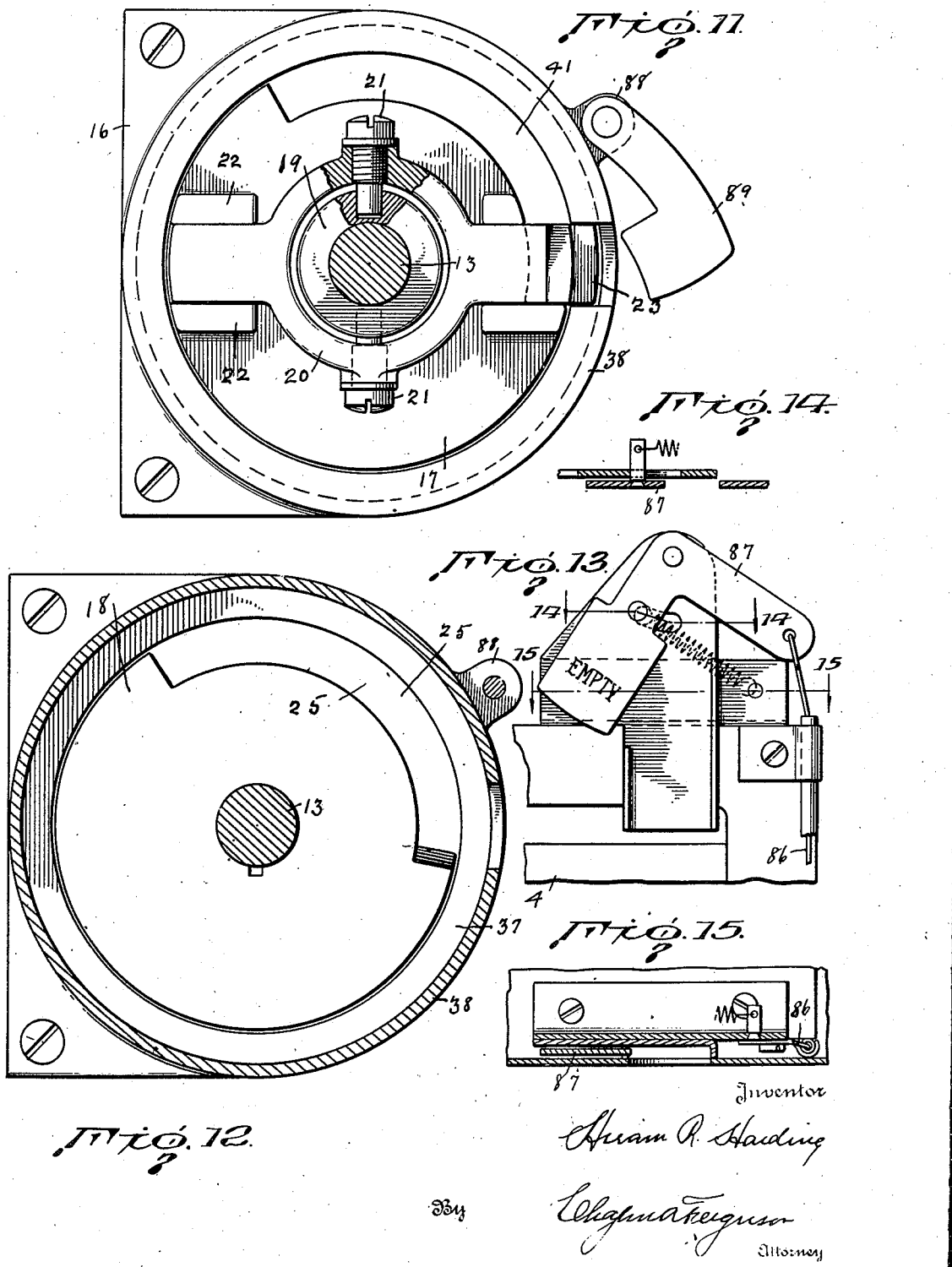

Jan. 26, 1943.  H. R. HARDING  2,309,449
BOTTLE VENDING AND EMPTY BOTTLE RECEIVING MACHINE
Filed Sept. 7, 1939  9 Sheets-Sheet 7
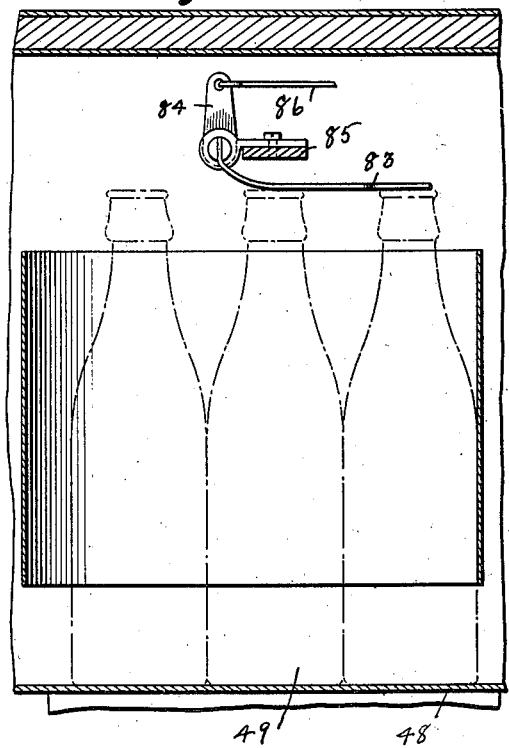
Fig. 16
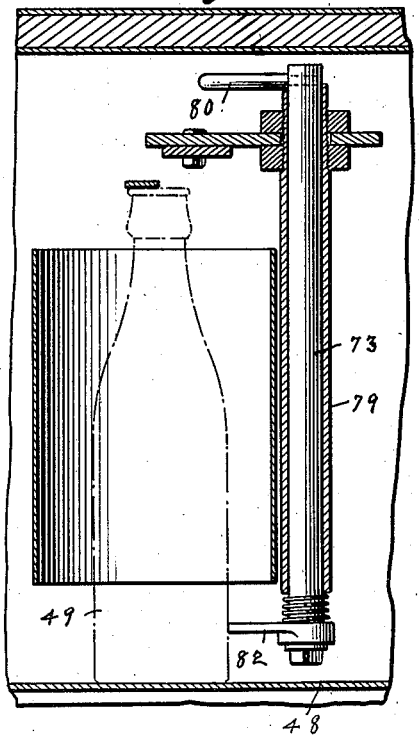
Fig. 17
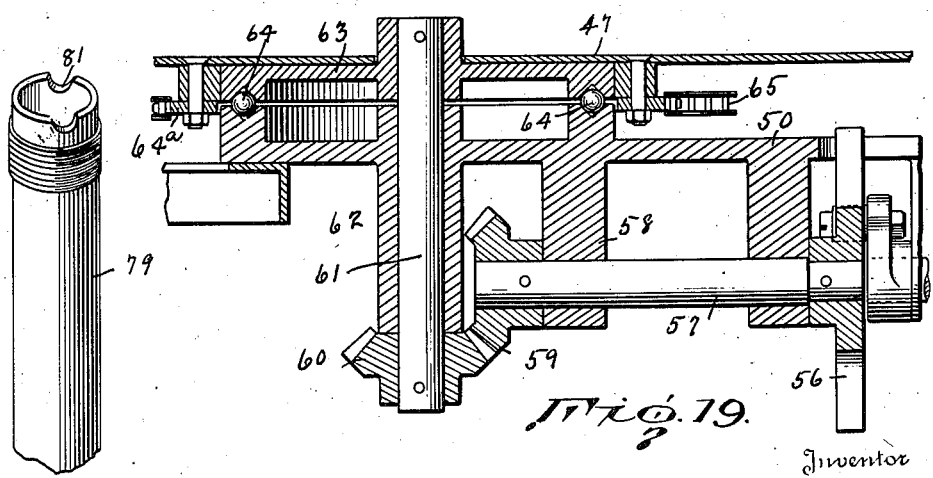
Fig. 18
Fig. 19
Inventor
Hiram R. Harding
By Chapman A Ferguson
Attorney Patented Jan. 26, 1943

2,309,449

UNITED STATES PATENT OFFICE 2,309,449

BOTTLE VENDING AND EMPTY BOTTLE RECEIVING MACHINE

Hiram R. Harding, Baltimore, Md., assignor to The Harding Machine Company, Incorporated, Baltimore, Md.

Application September 7, 1939, Serial No. 293,803

3 Claims. (Cl. 312—36)

This invention relates to an improved bottle vending and empty bottle receiving machine, and has for its object to provide a machine operated by a coin for vending bottled drinks and for receiving the empty bottles; the vending machine as well as the empty bottle receiving machine being refrigerated.

A further object of the invention is to discharge one bottle at a time as each coin is deposited, and to provide means for indicating when the machine is empty; also to hold the machine against operation when it is being filled.

The invention consists of the novel construction and arrangement of the parts and combination of parts hereinafter more fully set forth in the accompanying drawings, and pointed out in detail in the appended claims.

In the accompanying drawings:

Figure 1 is a front elevation of my invention.

Figure 2 is a top plan view of Figure 1.

Figure 3 is an enlarged section taken on the line 3—3 of Figure 4.

Figure 4 is a section on the line 4—4 of Figure 3.

Figure 5 is an enlarged section on the line 5—5 of Figure 4.

Figure 6 is a detail section of the crank-shaft and cam connected thereto.

Figure 7 is an enlarged section on the line 7—7 of Figure 5.

Figure 8 is an enlarged section on the line 8—8 of Figure 4.

Figure 9 is a section on the line 9—9 of Figure 8.

Figure 10 is a detail perspective view of the coin-holding arm.

Figure 11 is a section on the line 11—11 of Figure 8.

Figure 12 is a section on the line 12—12 of Figure 8.

Figure 13 is an enlarged elevation of the lever that operates over the coin opening to indicate when the machine is empty.

Figure 14 is a detail section on the line 14—14 of Figure 13.

Figure 15 is a section on the line 15—15 of Figure 13.

Figure 16 is an enlarged section on the line 16—16 of Figure 3.

Figure 17 is an enlarged section on the line 17—17 of Figure 3.

Figure 18 is an enlarged detail view of the sleeve in which the bottle adjuster operates.

Figure 19 is an enlarged detail section of one of the bottle-carrying disks and mechanism for operating same.

Figure 20:
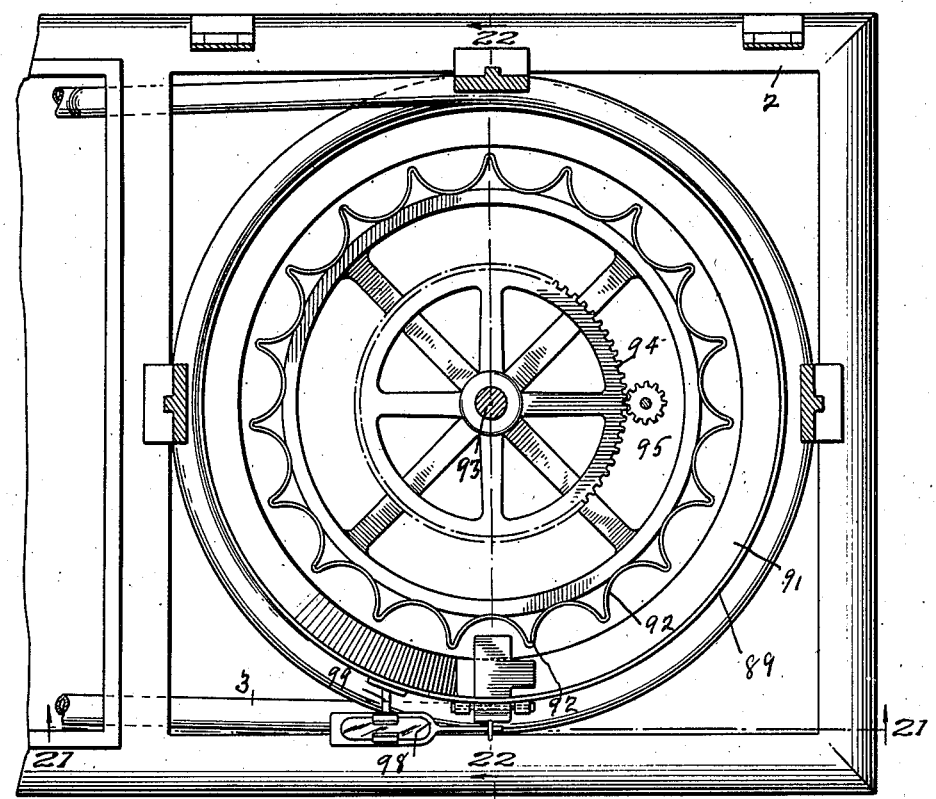
Figure 20 is an enlarged plan view of the empty bottle receiving cabinet with the cover removed.
Figure 21:
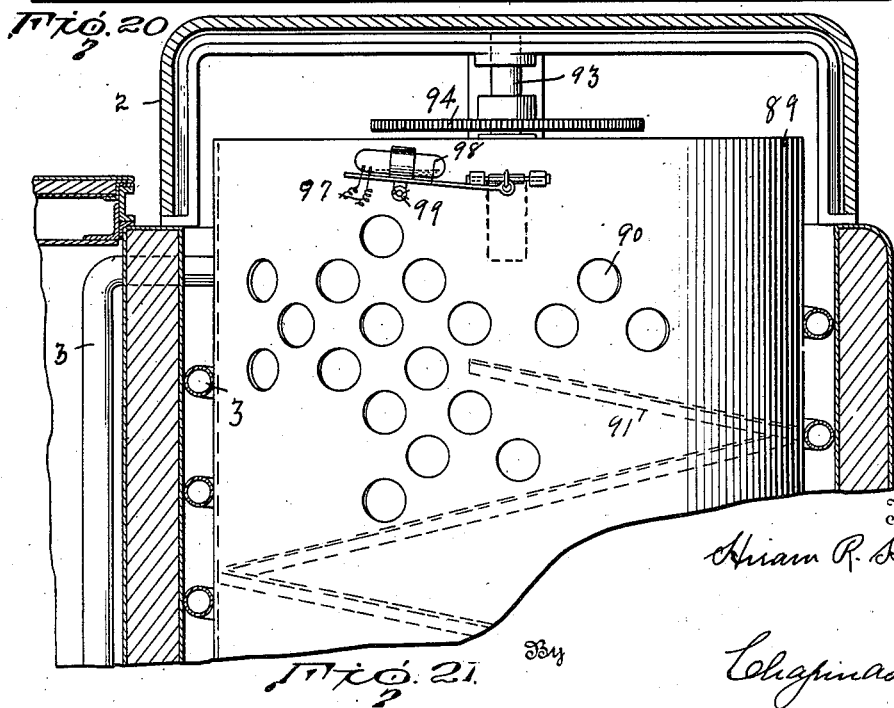
Figure 21 is a section on the line 21—21 of Figure 20.
Figure 22:
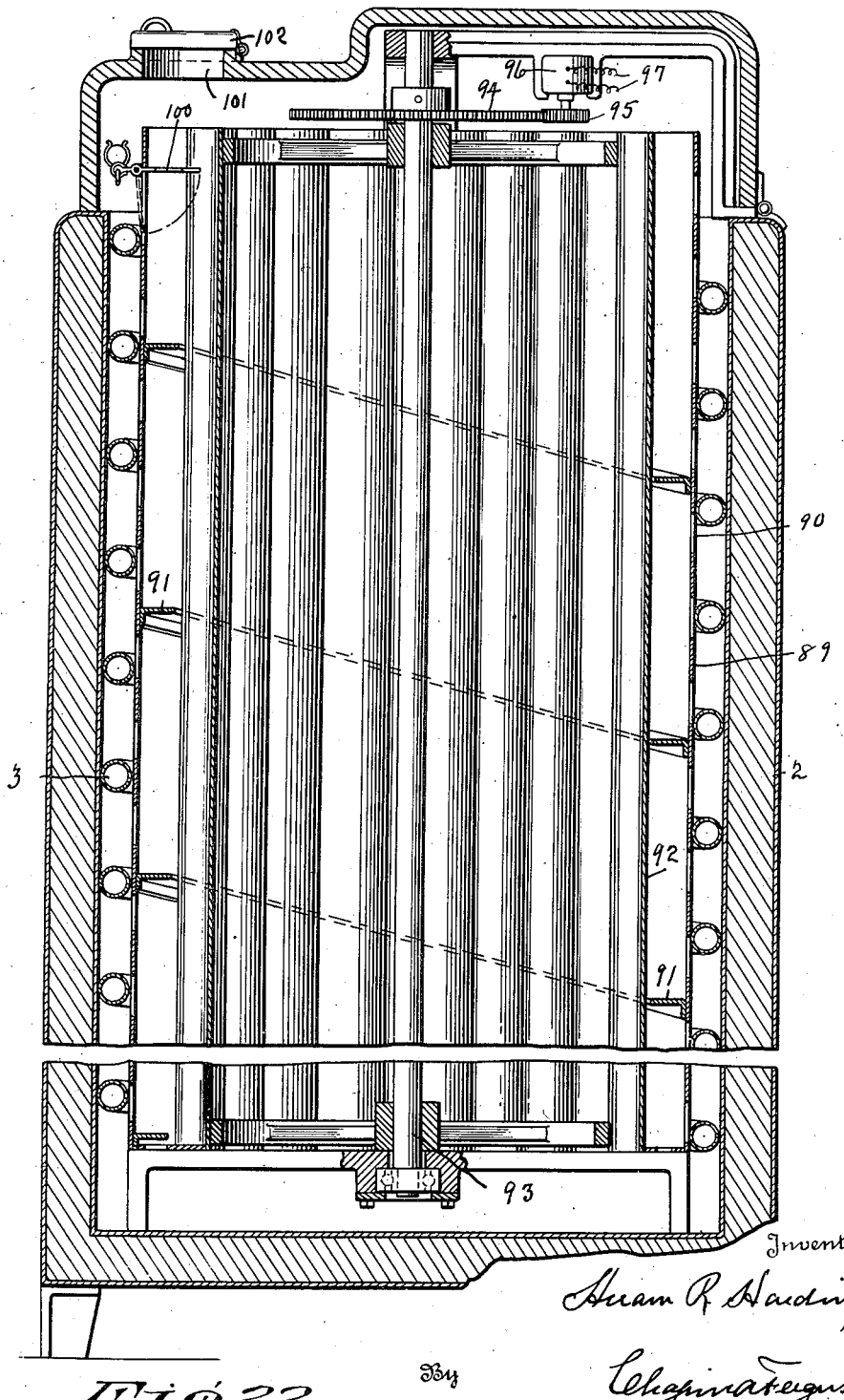
Figure 22 is a section on the line 22—22 of Figure 20.

Referring to the accompanying drawings, forming part of this specification, and in which like reference numerals designate like parts throughout the several views thereof, 1 designates the bottle vending cabinet and 2 the empty bottle receiving cabinet, both of which are refrigerated through the pipes 3—3 connected to a condenser and compressor (not shown) located in the cabinet 1. The cabinet 1 is provided with a case 4 on the top thereof through which the coin is inserted to operate the machine. The said cabinet 1 is provided with a cover 5 hinged at 6 which can be raised when filling the said cabinet 1 with bottles to be vended. The crank-handle 7 is mounted on the crank-shaft 8 in the upper end of the case 4, said shaft having a ratchet-wheel 9 rigid thereon which cooperates with the spring pawl 10 to prevent the said shaft from being turned backward. The said shaft 8 has an intermittent gear 11 thereon adapted to mesh with the intermittent gear 12 on the shaft 13 which latter is mounted in the bearings 14 and 15 on the standard 16. The lower end of the shaft 13 projects through the upper disk 17 to which it is rigidly secured and has its lower end terminating in the lower disk 18. The upper disk 17 has a boss 19 on its upper surface to which is fulcrumed the rock-arm 20 which rocks on the ends of the screws 21. One end of said arm 20 operates between the lugs 22 on the top of the upper disk 17 and its opposite end is provided with an outwardly-projecting flange 23 and a projection 24 on its lower surface adapted to project into the opening 25 in the lower disk 18 to turn the latter with the upper disk 17. A coiled-spring 26 is held between the arm 20 and the upper disk 17 to hold the said arm 20 in its normal position. The crank-shaft 8 has a cam 27 secured thereon which operates against the roller 28 on the yoke 29 to raise the latter when the crank-handle is turned, which through the medium of the rod 30, lifts the end of the lever 31, which latter is secured to one end of the shaft 32 which operates in the bearing 33 and on the opposite end of the shaft 32 is rigidly secured a coin-holding arm 34 having a slot 35 through which the coin 36 falls and rests on the end of the rock-arm 20. When the coin 36 is in position, and the coin-holding arm 34 is forced down by the cam 27, through the connecting means just described, the coin 36, resting on the end of the rock-arm 20, will cause the latter to be forced down until the projection 24 extends into the opening 25 in the disk 18 and the outwardly-projecting flange 23 comes in line with the annular groove 37 in the side of the casing 38. The coin is first dropped into the coin slot in the case 4 and passes through the coin detector 39 and if the coin 36 is a slug, or counterfeit, it will fall out of the machine, but if it is good, it will fall through the chute 40, into the slot 35 of the arm 34, and rest on the end of the rock-arm 20, as shown in Figures 8 and 9 of the drawings. The intermittent gears on the shafts 8 and 13 will not come into mesh to revolve the shaft 8 until the crank-handle 7 has been turned sufficiently to allow the coin to drop into position in the slot 35 in the arm 34, and through the medium of the cam 27 and its connecting means, force the coin end of the coin-arm 34 down, and the coin 36, resting on the rock-arm 20, the latter would be forced down causing the projection 24 to extend through the openings 41 and 25 in the upper and lower disks 17 and 18, respectively, at the same time the flange 23 of the arm 20 will be opposite the annular groove 37 in the casing 38. At this point, a continual revolving of the crank-handle 7 causes the intermittent gears on the shafts 8 and 13 to mesh revolving the shaft 13 which carries the rock-arm 20 around with the flange 23 extending into the annular groove 37 and when it has revolved sufficiently, the coin 36, resting on the top of said arm 20, will drop through the openings 41 and 25 of the upper and lower disks 17 and 18, respectively, and fall into a suitable container. The projection 24 on the arm 20 projecting into the opening in the lower disk 18 causes the latter to revolve and as it is keyed to the shaft 42, revolves the latter. When the disks 17 and 18 and arm 20 have made one complete revolution, the end of the arm 20 comes in line with the opening 43 and causes the rock-arm 20 to be released from the annular groove 37 and to be raised by the coiled-spring 26. Within the casing 1 are a number of cross-pieces 44 secured to the casing and from which are hung the spirals 45, held to said cross-pieces by the rods 46. These spirals 45 project down to within a short distance of the disks 47 and 48 and form runways for the bottles 49 which rest on said disks 47 and 48. The lower end of the shaft 42 is mounted in the bearing 149 on the frame 50 and has a bevel-gear 51 on its lower end in mesh with the bevel-gear 52 on the shaft 53, the said shaft 53 has a crank-arm 54 on one end having a roller 55 which cooperates with the Geneva wheel 56 mounted on the shaft 57, which latter is mounted in the bearing 58 on the frame 50. The said shaft 57 has a bevel-gear 59 on its opposite end in mesh with the bevel-gear 60 on the lower end of the shaft 61. The said shaft 61 extends through the bearing 62 on the frame 50. Secured to the upper end of the shaft 61 is a circular plate 63 mounted on ball-bearings 64 and adapted to revolve with the shaft 61. On the top of the plate 63 is secured the disk 47 which revolves with said plate 63. Also secured to the plate 63 is a sprocket-wheel 64a around which the chain 65 extends, said chain 65 is crossed and extends around another sprocket-wheel 66 which is secured to the plate 67. The disk 48 is secured to and revolves with the plate 67 which is mounted on the casting 68 secured to the frame 50. The chain 65 being crossed at the center, causes the disks 47 and 48 to operate in opposite directions. Secured to the lower end of the casting 68 is a bearing 69 in which is mounted a rod 70 having a pin 71 projecting from the lower end and over which one end of the bell-crank lever 72 fits. This rod 70 is adapted to move up and down in the bearing 69 and has lazy tongs 73 pivoted to its upper end, said lazy tongs being pivoted at its lower end to a boss 74 on the inner surface of the bearing 69 and has a platform 75 on its upper end. The opposite end of the bell-crank lever is secured to a rod 76 which has a yoke 77 on its opposite end adapted to cooperate with a cam on the shaft 53 to rock said bell-crank lever to operate the lazy tongs 73 to raise and lower the latter. When it is desired to fill the machine, the rod 78 which is mounted in the sleeve 79 is raised until the handle 80 is free of the recess 81 and turned to the position shown in Figure 17 of the drawings with the first bottle against the pin 82 on the lower end of the rod 78. When the bottles are all placed in the runways between the spirals and resting on the disks 47 and 48, the rod 78 is raised and turned in the opposite direction to allow the bottles to move on to the platform 75. The bottles pass a resilient strip of metal 83 secured to one end of the lever 84 which latter is pivoted to a bracket 85. The opposite end of the lever 84 is secured to a cord, or wire, 86 leading to one arm of the bell-crank lever 87. The opposite end of the lever 87 has the word "Empty" thereon and extends over the coin opening when the machine is empty. As the bottles all pass under the metal strip 83, they force it up and keep the cord, or wire, 86 taut and hold the bell-crank lever from coming over the coin opening and when the last bottle has passed under the strip 83, the latter drops and allows the cord, or wire, 86 to become slack and the end of the bell-crank lever to drop and expose the word "Empty" over the coin opening. On the side of the casing 38 is a lug 88 to which is pivoted an arm 89 adapted to extend into the opening in said casing 38 and project over the end of the rock-arm 20 to prevent the latter from being operated when the machine is being filled, or for other reasons.

The operation of the vending machine is as follows:

The coin is first dropped into the coin slot and rolls down into the coin-holding arm 34 and rests on the rock-arm 20. As the crank-handle 7 is turned, the intermittent gears 11 and 12 on the shafts 8 and 13 will not mesh until the cam and its connecting means, heretofore described, has first operated to force the coin and the rock-arm 20 down at one end with the projection on the lower end of said rock-arm projecting through the disks 17 and 18 bringing the end of the rock-arm in line with the groove in the casing 38. At this point, the intermittent gears 11 and 12 come into mesh and revolve the shaft 13 and also the disks 17 and 18, causing the coin to drop off of the rock-arm and fall through the openings 25 and 41 to a suitable container, the said disks 17 and 18 moving together revolve the shaft 42. At this point, the lazy tongs are in the raised position and the crank-arm and roller are out of connection with the Geneva wheel 56 and the revolving of the shaft 52 forces the lazy tongs down to its normal position with its platform in line with the disks 47 and 48, and as the shaft 53 continues to revolve, the roller moves into the Geneva wheel 56, revolving the latter and through the mechanism heretofore described, revolves the disks 47 and 48, carrying the bottles around the runway until one bottle has moved on to the platform 75 at which point the arm and roller move away from the Geneva wheel 56 and stop the revolving of the disks 47 and 48, at the same time, the revolving of the shaft 53 through the medium of the cam thereon, causes the bell-crank lever 72 to rock and extend the lazy tongs and raising the platform 75 carrying the bottle up through the opening 103 in the top of the cabinet 1, raising the door 104 to the position shown in Figure 4 of the drawings when the bottle is removed and the said door closed. This action is repeated each time a coin is deposited and a bottle is to be vended from the cabinet.

Having thus described my invention, what I claim is:

1. A head for bottle vending machines adapted to fit into a cabinet and comprising two disks revolubly mounted in said head on the same longitudinal plane and adapted to revolve in opposite directions, means for revolving said two disks, a spiral runway mounted in said head above said two disks, and means adjacent one of said disks to lift one bottle at a time from said head.

2. A bottle vending machine comprising a head, a crank-shaft mounted in said head, means for revolving said crank-shaft, a vertical shaft operated by said crank-shaft, a disk on the lower end of said vertical shaft, a second vertical shaft having a disk secured to its upper end and against the first-named disk, means connecting said two disks to cause the said two vertical shafts to revolve together, a spiral runway mounted in said head, two disks revolubly mounted adjacent each other on the same longitudinal plane below said runway, means operated by said last named vertical shaft for revolving one of said last-named disks, means connecting the said two last named disks for revolving them in opposite directions, means for lifting one bottle at a time from the said head.

3. A bottle vending machine comprising a head adapted to fit into a cabinet, a spiral runway mounted in said head around which the bottles travel, two disks revolubly mounted in said head below said runway adjacent each other and on the same longitudinal plane, a shaft revolubly mounted in said head, means operated by said shaft for revolving the said two disks in opposite directions, means for revolving said shaft, and means operated by said shaft for lifting one bottle at a time through said head and cabinet.

HIRAM R. HARDING.